United States Patent
Makin, III et al.

(10) Patent No.: US 12,518,559 B2
(45) Date of Patent: Jan. 6, 2026

(54) DETECTION OF FACE MANIPULATION BY QUANTIFIED DISORDER MEASUREMENTS

(71) Applicant: Board of Trustees of Western Michigan University, Kalamazoo, MI (US)

(72) Inventors: Robert Allen Makin, III, Kalamazoo, MI (US); Steven Michael Durbin, Kalamazoo, MI (US)

( * ) Notice: Subject to any disclaimer, the term of this patent is extended or adjusted under 35 U.S.C. 154(b) by 411 days.

(21) Appl. No.: 18/204,570

(22) Filed: Jun. 1, 2023

(65) Prior Publication Data

US 2023/0394872 A1 Dec. 7, 2023

Related U.S. Application Data

(60) Provisional application No. 63/348,277, filed on Jun. 2, 2022.

(51) Int. Cl.
| | | |
|---|---|---|
| G06V 40/16 | (2022.01) | |
| G06V 10/50 | (2022.01) | |
| G06V 20/00 | (2022.01) | |

(52) U.S. Cl.
CPC ............ *G06V 40/16* (2022.01); *G06V 10/507* (2022.01); *G06V 20/95* (2022.01)

(58) Field of Classification Search
CPC ....... G06V 40/16; G06V 20/95; G06V 10/507
See application file for complete search history.

(56) References Cited

U.S. PATENT DOCUMENTS

| | | |
|---|---|---|
| 3,309,553 A | 3/1967 | Kroemer |
| 3,413,533 A | 11/1968 | Kroemer et al. |
| 4,792,832 A | 12/1988 | Baba et al. |
| 4,833,101 A | 5/1989 | Fujii |

(Continued)

FOREIGN PATENT DOCUMENTS

| | | |
|---|---|---|
| CN | 111260645 A | 6/2020 |
| CN | 113435292 A | 9/2021 |

(Continued)

OTHER PUBLICATIONS

Zhang et al, "Image Region Forgery Detection: A Deep Learning Approach" (pp. 1-11) (Year: 2016).*

(Continued)

*Primary Examiner* — Manav Seth

(57) ABSTRACT

Some aspects of the present invention may include systems and methods of a detecting whether a first image contains a region that has been manipulated, methods comprising obtaining a second image, wherein the second image comprises at least a part of the first image, said at least a part of the first image containing the region suspected of being manipulated; determining a numerical value of an order parameter (S or $S^2$) of the second image; determining a numerical value of an order parameter (S or $S^2$) of a third image, the third image comprising the second image with the region suspected of being manipulated removed; and comparing the numerical value of the second image (S or $S^2$) with the numerical value (S or $S^2$) of the third image to determine if the first image has been altered, by reference to a predefined criteria indicative of a manipulated image.

20 Claims, 3 Drawing Sheets

(56) References Cited

U.S. PATENT DOCUMENTS

| | | | |
|---|---|---|---|
| 4,978,853 | A | 12/1990 | Hilal |
| 6,195,457 | B1* | 2/2001 | de Queiroz ............... G06T 9/00 |
| | | | 382/168 |
| 7,951,494 | B2 | 5/2011 | Sawa et al. |
| 8,981,382 | B2 | 3/2015 | Gao |
| 9,622,698 | B2 | 4/2017 | Mestha et al. |
| 9,711,182 | B2* | 7/2017 | Dharssi ............... H04N 21/812 |
| 9,864,903 | B2 | 1/2018 | Cheswick |
| 9,876,248 | B2 | 1/2018 | Hiraiwa et al. |
| 10,381,673 | B2 | 8/2019 | Miller et al. |
| 10,446,189 | B2 | 10/2019 | Zukerman et al. |
| 10,810,725 | B1 | 10/2020 | Dolhansky et al. |
| 11,545,563 | B2 | 1/2023 | Makin, III et al. |
| 12,373,971 | B2* | 7/2025 | Fisher ....................... G06T 3/60 |
| 2013/0240026 | A1 | 9/2013 | Atwater et al. |
| 2015/0213305 | A1 | 7/2015 | Sundström |
| 2016/0140405 | A1 | 5/2016 | Graumann et al. |
| 2017/0172487 | A1 | 6/2017 | Aharon |
| 2018/0083155 | A1 | 3/2018 | Mahajan et al. |
| 2018/0122969 | A1 | 5/2018 | Olenick et al. |
| 2018/0361287 | A1 | 12/2018 | Zhang |
| 2019/0168144 | A1 | 6/2019 | Umebayashi |
| 2020/0227751 | A1 | 7/2020 | Mimura et al. |
| 2020/0334347 | A1 | 10/2020 | Hoyos et al. |
| 2021/0036310 | A1 | 2/2021 | Hou et al. |
| 2021/0117690 | A1 | 4/2021 | Ye |
| 2021/0119237 | A1 | 4/2021 | Lee et al. |
| 2021/0202988 | A1 | 7/2021 | Kim et al. |
| 2021/0349093 | A1 | 11/2021 | Makin, III et al. |
| 2021/0359324 | A1 | 11/2021 | Armstrong |
| 2022/0121884 | A1 | 4/2022 | Zadeh et al. |
| 2022/0347610 | A1 | 11/2022 | Makin, III et al. |
| 2022/0365243 | A1 | 11/2022 | Makin, III et al. |
| 2023/0000426 | A1 | 1/2023 | Makin, III et al. |

FOREIGN PATENT DOCUMENTS

| | | | | |
|---|---|---|---|---|
| EP | 3629232 | A1 | | 4/2020 |
| JP | H1141589 | A | * | 2/1999 ............... H04N 7/18 |
| JP | 4727031 | B2 | * | 7/2011 ............... A61B 8/06 |
| JP | 6191368 | B2 | | 9/2017 |
| KR | 100737040 | B1 | * | 7/2007 ........... G01S 7/5206 |
| KR | 2011043082 | A | * | 4/2011 ............. G06T 5/40 |
| WO | WO-2012167365 | A1 | * | 12/2012 ............. H04N 5/272 |
| WO | 2014072375 | A1 | | 5/2014 |
| WO | 2021137946 | A1 | | 7/2021 |
| WO | PCT/US23/24135 | | | 6/2023 |
| WO | PCT/US23/24243 | | | 6/2023 |

OTHER PUBLICATIONS

Chang et al., "A forgery detection algorithm for exemplar-based inpainting images using multi-region relation" (pp. 57-71) (Year: 2013).*

Loveluck, J. and Sokoloff, J., "Theory of the optical properties of phonon systems with disordered force constants, with application to $NH_4Cl$," J. Phys. Chem. Solids 34,869 (1973).

Berger, R.F., Fennie, C.J., and Neaton, J.B., "Band Gap and Edge Engineering via Ferroic Distortion and Anisotropic Strain: The Case of $SrTiO_3$," Phys. Rev. Lett. 107, 146804 (2011).

Fioretti, A.N., Stokes, A., Young, M.R., Gorman, B., Toberer, E.S., Tamboli, A.C., and Zakutayev, A., "Effects of Hydrogen on Acceptor Activation in Ternary Nitride Semiconductors," Advanced Electronic Materials, vol. 3, 1600544 (2017).

Harding, C., Pompei, F., Bordonaro, S.F., McGillicuddy, D.C., Burmistrov, D., Sanchez, L.D., "The daily, weekly, and seasonal cycles of body temperature analyzed at large scale," Chronobiology International, Dec. 2, 2019, vol. 36(12), pp. 1646-57.

Jaroenjittichai, A.P. and Lambrecht, W.R.L., "Electronic band structure of Mg—IV—N2 compounds in the quasiparticle-self-consistent GW approximation," Phys. Rev. B 94, 125201 (2016).

Kanchiang, K., Cheiwchanchamnangij, T., Laosiritawron, Y., Pramchu, S., and Jaroenjittichai, A.P., "Structural and electronic properites of $MgGexSn(1-x)N2$ semiconductors: The density functional theory investigation," Journal of Physics: Conference Series, 1144, 012149 (2018).

Kawamura, F., Yamada, N., Imai, M., and Taniguchi, T., "Synthesis of $ZnSnN2$ crystals via a high-pressure metathesis reaction," Cryst. Res_ & Technol., vol. 51,220 (2016).

Kresse, G, and Furthmuller, J., "Efficiency of ab-initio total energy calculations for metals and semiconductors using a plane-wave basis set," Comput. Mater. Sci. 6,15 (1996).

Kresse, G. and Furthmuller, J., "Efficient iterative schemes for ab initio total-energy calculations using a plane-wave basis set," Phys. Rev. B 54, 11169 (1996).

Kresse, G. and Hafner, J., "Ab initio molecular dynamics for liquid metals," Phys. Rev. B 47, 558 (1993).

Kresse, G. and Hafner, J., "Ab initio molecular-dynamics simulation of the liquid-metal-amorphous-semiconductor transition in germanium," Phys. Rev. B 49, 14251 (1994).

Kresse, G. and Joubert, D., "From ultrasoft pseudopotentials to the projector augmented-wave method," Phys. Rev. B. F.101_ 59, 1758-1775 (1999).

Lahourcade, L., Coronel, N.C., Delaney, K.I., Shukla, S.K, Spaldin, N.A., and Atwater, H.A., "Structural and Optoelectronic Characterization of RF sputtered ZnSnN(2)," Advanced Materials, 25, 2562 (2013).

Lebens-Higgins, Z., Scanlon, D.O., Paik, H., Sallis, S., Nie, Y., Uchida, M., Quackenbush, N.F., Wahila, M.J., Sterbinsky, G.E., Arena, D.A., Woicik, J.C., Schlom, D.G., and Piper, L.F.J., "Direct Observation of Eletrostatically Driven Band Gap Renormalization in a Degenerate Perovskite Transparent Conducting Oxide," Phys. Rev. Lett. 116, 024602 (2016).

Lin, Yu-Jen et al., "A Rapid and Sensitive Early Diagnosis of Influenza Virus Subtype via Surface Enhanced Raman Scattering," Journal of Biosensors & Bioelectronics [Internet], 2014 [cited May 5, 2020], vol. 05(02), Available from: https://www.omicsonline.org/open-access/a-rapid-and-sensitive-early-diagnosis-of-influenza-virus-subtype-via-surface-enhanced-raman-scattering-2155-6210.1000150.php?aid=27090.

Liu, H., Li, Z., Cao, Y., Cui, Y., Yang, X., Meng Z. et al., "Effect of chondrocyte mitochondrial dysfunction on cartilage degeneration: A possible pathway for osteoarthritis pathology at the subcellular level," Molecular Medicine Reports, bet. 1, 2019, vol. 20(4), pp. 3308-3316.

Makin, R. A., Senabulya, N., Mathis, J., Feldberg, N., Miska, P., Clarke, R., and Durbin, S. M., "Growth of Ordered and Disordered $ZnSnN2$," J. Vac. Sci. Technol. B 35, 02B116 (2017).

Momma, K. and Izumi, F., "Vesta 3 for three-dimensional visualization of crystal, volumetric and morphology data," J. Appl. Crystallogr. 44, 1272 (2011).

NIAID, "MERS-CoV Particles," 2013, Available from: https://www.flickr.com/photos/niaid/8618697423/.

NIAID, "Novel Coronavirus SARS-CoV-2, 2020," Available from: https://www.flickr.com/photos/niaid/49641177636/.

Nussbaum-Krammer, C.I., Park, K-W, Li, L., Melki, R., Morimoto, RI., "Spreading of a Prion Domain from Cell-to-Cell Dy Vesicular Transport in Caenorhabditis elegans," PLOS Genetics, Mar. 28, 2013, vol. 9(3), e1003351.

Ober, J.A., "Mineral Commodity Summaries 2016," technical report, Reston, VA (2016).

Perdew, J.S., Burke, K., and Emzerhof, M., "Generalized Gradient Approximation Made Simple," Phys. Rev. Lett., vol. 77, pp. 3865-3868 (1996).

Peshek, T. J., Paudel, T. R., Kash, K., and Lambrecht, W.R.L., "Vibrational modes in ZnGeN2: Raman study and Theory," Phys. Rev. B 77, 235213 (2008).

Qin, R., Cao, H., Liang, L., Xie, Y., Zhuge, F., Zhang, H., Gao, J. Javaid, K., Liu, C., and Sun, W., "Semiconducting ZnSnN2 thin films for Si/ZnSnN2 p-n junctions," Appl. Phys, Lett., col. 108, 142104 (2016).

Quayle, P.T., Junno, G.T., He, K., Blanton, E.W., Shan, J., and Kash, K., "Vapor-liquid-solid synthesis of ZnSnN2," Phys. Status Solidi B, vol. 254, 1600718 (2017).

(56) References Cited

OTHER PUBLICATIONS

R. Jaffe, J. Price, M. Hitzman, and F. Slakey, "The Back Page, Energy Critical Elements," APS News, vol. 20, No. 4 (2011).
Reid, A.H., Taubenberger, J.K., Fanning, T.G., "The 1918 Spanish influenza: integrating history and biology," Microbes Infection, Jan. 2001, vol. 3(1), pp. 81-87.
Sarma, D.D., Shanthi, N., Barman, S.R., Hamada, N., Sawada, H., and Terakura, K., "Band Theory for Ground-State Properties and Exication Spectra of Perovskite LaMO3 ( M=Mn, Fe, Co, Ni)," Phys. Rev. Lett. 75, 1126 (1995).
Science Source, "SARS Coronavirus," TEM, at least as early as May 6, 2019, Available from: https://www.sciencesource.com/CS.aspx?VP3=SearchResult&ITEMID=SS2760539&POPUPPN= 1 &POPUPIID=20PEBMGD5GLU.
Sebastian, M., Peters, J.A., Stoumpos, C.C., Im, J., Kostina, S.S., Liu, S., Kanatzidis, M.G., Freeman, A.J. and Wessels, B.B., "Exitonic emissions and above-band-gap luminescence in the single-crystal perovskite Semiconductors CsPbBr3 and CsPbCI3m," Phys. Rev. B 92, 235210 (2015).
Shen, T.Y., Mitra, S.S., Prask, H. and Trevino, S.F., "Order-disorder phenomenon in sodium nitrate studied by low-frequency Raman scattering," Phys. Rev. B 12, 4530 (1975).
Upton, M.H., Choi, Y., Park, H., Liu, J., Meyers, D., Chakhalian, J., Middey, S., Kim, J.-W., and Ryan, "Novel Electronic Behavior Driving NdNiO3 Metal-Insulator Transition," P.J., Phys. Rev. Lett, 115, 036401 (2015).
Vidal, J., Trani, F., Bruneval, F., Marques, M.A.L., and Botti, S., "Effects of Electronic and Lattice Polarization on the Band Structure of Delafossite Transparent Conductive Oxides," Phys, Rev. Lett. 104, 136401 (2010).
Wei, S.-H., Ferreira, L.B., and Zunger, A., "First-principles calculation of the order-disorder transition in chalcopyrite semiconductors," Phys. Rev. B, vol. 45, pp. 2533-2536 (1992).
Wilchinsky, Z. W., "X-Ray Measurement of Order in the Alloy Cu3Au," J. Appl. Phys. 15, 806 (1944).
Yan, X.-W., Gao, M., Lu, Z.-Y., and Xiang, T., "Electronic Structures and Magnetic Order of Ordered-Fe-Vacancy Ternary Iron Selenides TIFe1.5Se2 and AFe1.5Se2 (A=K, Rb, or Cs)," Phys. Rev, Lett, 106, 087005 (2011).
Makin, R. A. et al., "Quantitative Disorder Analysis and Particle Removal Efficiency of Polypropylene-Based Masks," Dept. of Computer Eng., Western Michigan University, Kalamazoo, MI, Dec. 1, 2020, pp. 3853-2861, DOI: 10.1557/adv.2020.346.
Agranovski, I. E. et al., "Enhancement of the performance of low-efficiency HVAC filters due to continuous unipolar ion emission," Aerosol Science and Technology 40, 2006, pp. 963-968.
Auriemma, F. et al., "Structural Disorder in the a Form of Isotactic Polypropylene," Macromolecules 33, 8764 Oct. 1, 2000.
De Rosa, C. et al., "Polymorphism in polymers: A tool to tailor material's properties," Polymer Crystallization, 2020, 3: e10101.
G. Allegra, P. Corrandini and P. Ganis, "A model of the chain conformation of an isotactic vinyl polymer having opitcally active side groups," Macromolecular Chemistry and Physics, vol. 90, 1966, pp. 60-65.
H. Li, W. Wu, M.M. Bubakir, H. Chen, X. Zhong, Z. Liu, Y. Ding, and W. Yang, J., "Polypropylene fibers fabricated via a needleless melt-electrospinning device for marine oil-spill cleanup," Appl. Polymer Science, vol. 131, 2014.
Hiejima, Y. et al., "Investigation of the Molecular Mechanisms of Melting and Crystallization of Isotactic Polypropylene by in Situ Raman Spectroscopy," Macromolecules, vol. 50, 2017, pp. 5867-5876.
Hikosaka, M. et al., "The order of the molecular chains in isotactic polypropylene crystals," Polymer Journal, vol. 5, 1973, pp. 111-127.
Ho, R.-M. et al., "Helical architectures from self-assembly of chiral polymers and block copolymers," Progress in Polymer Science, vol. 36, 2011, pp. 376-453.
Lee, S. et al., "Reusable Polybenzimidazole Nanofiber Membrane Filter for Highly Breathable PM2.5 Dust Proof Mask", ACS Applied Materials & Interfaces 11, Jan. 7, 2019, pp. 2750-2757.
Liu, J. et al., "Low resistance bicomponent spunbond materials for fresh air filtration with ultra-high dust holding capacity," RSC Advances 7, 2017, pp. 43879-43887.
Principles of Equilibrium Statistical Mechanics, John Wiley & Sons, Ltd., 2005, Chapter 12—Mean-Field Theory III: Landau Formulation, pp. 432-469.
R. Ishidate, A. J. Markvoort, K. Maeda, and E. Yashima, "Unexpectedly Strong Chiral Amplification of Chiral/Achiral and Chiral/Chiral Copolymers of Biphenylylacetylenes and Further Enhancement/Inversion and Memory of the Macromolecular Helicity," J. Am. Chem. Soc. 141, 2019, pp. 7605-7614.
Makin, RA, York, K., Durbin, S.M., Senabulya, N., Mathis, J., Clarke, R., Feldberg, N., Miska, P., Jones, C.M., Deng, t, Williams, L., Kioupakis, E., Reeves, RJ., "Alloy-Free Band Gap Tuning across the Visible Spectrum," Phys. Rev. Lett. 122, 256403, 2019.
Bragg, W. L. and Williams, E. J., "The effect of thermal agitation on atomic arrangement in alloys," Proceedings of the Royal Society of London, Series A, Containing Papers of a Mathematical and Physical Character, vol. 145, pp. 699-730, 1934.
Morgan, RS., "Reciprocal ribose interactions: A possible structural motif in and between RNA'S," Biosystems, vol. 5, 1973, pp. 95-97.
Laks, D.B., Wei, S.-H., and Zunger, A., "Evolution of alloy properties with long-range order," Phys. Rev. Lett., vol. 69, pp. 3766-3770 (1992).
Wei, S., Laks, D.B., and Zunger, A., "Dependence of the optical properties of semiconductor alloys on the degree of long-range order," Appl. Phys. Lett., vol. 62, pp. 1937-1939 (1993).
Ma, J., Deng, H.-X., Luo, J.-W., and Wei, S.-H., "Origin of the failed ensemble average rule for the band gaps of disordered nonisovalent semiconductor alloys," Phys. Rev. B 90, 115201 (2014).
Nakatsuka, S. and Nose, Y., "Order-Disorder Phenomena and Their Effects on Bandgap in ZnSnP2," J. Phys. Chem. C 121, 1040 (2017).
Ryan, M., Peterson, M.W., Williamson, D., Frey, J.S., Maciel, G.E., and Parkinson, B., "Metal site disorder in zinc tin phosphide," J. Mater. Res. 2, 528 (1987).
St-Jean, P., Seryogin, G., and Francoeur, S., "Band gap of sphalerite and chalcopyrite phases of epitaxial ZnSnP 2 ZnSnP2," Appl. Phys. Lett. 96, 231913 (2010).
Makin, RA, York, K., Durbin, S.M., Reeves, R.J., "Revisiting semiconductor band gaps through structural motifs: An lsing model perspective," Phys. Rev. B 102, 115202—Published Sep. 8, 2020.
Makin, R.A. and Durbin, S.M., "Structural Motifs, Disorder, and the Efficacy of Viral Vaccines," bioRxiv 10.1101/2020.06.08.139907 (2020).
Cowley, J.M., "X-Ray Measurement of Order in Single Crystals of Cu3Au," J. Appl. Phys., vol. 21, 24 (1950).
Feldberg, N., Aldous, J., Linhart, W., Phillips, L., Durose, K., Stampe, P., Kennedy, R., Scanlon, D., Vardar, G., Field, R., III et al., "Growth, disorder, and physical properties of ZnSnN2," Appl. Phys. Lett. 103, 042109 (2013) doi: 10.1063/1.4816438.
Keating, D. T. and Warren, B. E., "Long-Range Order in Beta-Brass and Cu3Au," J. Appl. Phys. 22, 286 (1951 ).
Senabulya, N., Feldberg, N., Makin, RA., Yang, Y., Shi, G., Jones, C.M., Kioupakis, E., Mathis, J., Clarke, R., and Durbin, S.M., "Stabilization of orthorhombic phase in single-crystal ZnSnN2 films," AIP Adv. 6, 075019 (2016) doi: 10.1063/1.4960109.
Bragg W. L. et al., "The effect of thermal agitation on atomic arrangement in alloys—II," Proceedings of the Royal Society of London, Series A, Mathematical and Physical Sciences, vol. 151, pp. 540, Oct. 1, 1935, <https://doi.org/10.1098/rspa.1935.0165>.
Achiele, K.P., "Paul Klee's 'Rhythmisches': A Recapitulation of the Bauhaus Years," Zeitschrift fur Kunstgeschichte 57, 75 (1994).
Anderson, C., Zucker, F., and Steitz, T., "Space-filling models of kinase clefts and conformation changes," Science 204, 375 (1979).
Bhuiyan, A.G., Sugita, K., Kasashima, K., Hashimoto, A., Yamamoto, A., and Davydov, V.Y., "Single-crystalline InN films with an absorption edge between 0.7 and 2 eV grown using different techniques and evidence of the actual band gap energy," Applied Physics Letters, 83, 4788 (2003).
Bleckley, S. and Schroeder, S.J., "Incorporating global features of rna motifs in predictions for an ensemble of secondary structures for encapsidated ms2 bacteriophage rna," RNA 18, 1309 (2012).

(56) References Cited

OTHER PUBLICATIONS

Burstein, E., "Anomalous Optical Absorption Limit in InSb," Phys. Rev. 93, 632 (1954).
Cho, S.-H., "Effects of growth temperature on the properties of ZnO thin films grown by radio-frequency magnetron, sputtering," Transactions on Electrical and Electronic Materials 10, 185 (2009).
Cray, C. and Rowley, G., "Chinese and Western Composition: A Conversation between an Artist and an Art Historian," College Art Journal 15, 6 (1955).
Dimroth et al., "Wafer Bonded Four-junction GaInP/GaAs//GaInAsP/GaInAs Concentrator Solar Cells with 44.7% Efficiency," Progress in Pholovoltaics: Research and Applications, Prog. Pholovolt: Res. Appl. 2014, vol. 22, published Jan. 13, 2014, pp. 277-282, https://doi.org/10.1002/pip.2475.
Dixon, J.R., and Bis, R.F., "Band Inversion and the Electrical Properties of PbxSn1-xTe," Phys. Rev. 176, 942 (1968).
Feldberg et al., "ZnSnN2: A New Earth-Abundant Element Semiconductor for Solar Cells," Department of Physics, University at Buffalo, The State University of New York, Buffalo, NY, USA, IEEE, 2011 978-1-4673-0066-7/12, pp. 102524-002527 (4 pages).
Haddad, D.B., Thakur, J.S., Naik, V.M., Aun ER, G.W., Naik, R., and Wenger, L.E., "Optical Band Gap Measurements of InN Films in the Strong Degeneracy Limit," MRS Proceedings 743, L 11.22 (2002).
Holonyak, N. and Bevacqua, S.F., "Coherent (Visible) Light Emission From Ga(As1xPx) Junctions," Applied Physics Letters 1, 82 (1962).
Ichimiya, A., Cohen, P.I., and Cohen, P.I., "Reflection high-energy electron diffraction," Cambridge University Dress (2004).
Inushima, T., Mamutin, V., Vekshin, V., Ivanov, S., Sakon, T., Motokawa, M., and Ohoya, S., "Physical properties of InN with the band gap energy of 1.1ev," Journal of Crystal Growth 227-228, 481 (2001).
Janssen, B., Burgoyne, J.A., and Honing, H., "Predicting Variation of Folk Songs: A Corpus Analysis Study on the Memorability of Melodies," Frontiers in Psychology 8, 621 (2017).
Ji, X.H., Lau, S.P., Yang, HY., and Zhang, Q.Y., "Thin Solid Films" 515, 4619 (2007).
Kronig, R.D.L., Penney, W.G., and Fowler, R.H., "Quantum mechanics of electrons in crystal lattices," Proceedings of the Royal Society of London, Series A, Containing Papers of a Mathematical and Physical Character 130,499 (1931).
Kurimoto, E., Hangyo, M., Harisma, H., Yoshimoto, M., Yamaguchi, T., Araki, T., Nanishi, Y., and Kisoda, K., "Spectroscopic observation of oxidation process in InN," Applied Physics Letters 84, 212 (2004).
Lacklison, D.E., Orton, J.W., Harrison, I., Cheng, T.S., Jenkins, L.C., Foxon, C.T., and Hooper, S.E., "Band gap of GaN films grown by molecular-beam epitaxy on GaAs and GaP subsrtates," Journal of Applied Physics 78, 1838 (1995).
Makin et al., "Order Parameter and Band Gap of ZnSnN2," Department of Electrical and Computer Engineering, Nestern Michigan University, Kalamazoo, Michigan, 978-1-5386-8529-7/18, 2018, IEEE, pp. 3865-3868.
Mang, A., Reimann, K., and Robenacke, S., "Band gaps, crystal-field splitting, spin-orbit coupling, and exciton binding energies in ZnO under hydrostatic pressure," Solid State Communications 94, 251 (1995).
Moss, T.S., "The interpretation of the properties of indium antimonide," Proceedings of the Physical Society, Section B 67, 775 (1954).
Ruhle, S., "Tabulated Values of the Shockley-Queisser Limit for Single Junction Solar Cells," Solar Energy Consulting, vol. 130, 2016, pp. 139-147, <http:/dx.doi.org/10.1016/j.solener.2016.02.15>.
Slotboom, J., and De Graaff, H., "Measurements of bandgap narrowing in Si bipolar transistors," Solid-State Electronics 19, 857 (1976).

Walukiewicz, W., Li, S., Wu, J., Yu, K., Ager, J., Haller, E., Lu, H., and Schaff, W.J., "Optical properties and electronic structure of InN and In-rich group III-nitride alloys," Journal of Crystal Growth 269, 119 (2004).
Bragg, W. L. and Williams, E. J., "The effect of thermal agitation on atomic arrangement in alloys—III," Proceedings of the Royal Society of London, Series A, Mathematical and Physical Sciences, vol. 152, Oct. 15, 1935, pp. 231-252.
Ager, J.W., Walukiewicz, W., Shan, W., Yu, K.M., Li, S.X., Haller, E.E., Lu, H., and Schaff, W.J., "Multiphonon resonance Raman scattering in InxGa1-xN," Phys. Rev. B 72, 155204 (2005).
Arnaudov, B., Paskova, T., Paskov, P.P., Magnusson, B., Valcheva, E., Monemar, B., Lu, H., Schaff W.J., Amano, H., and Akasaki, I., "Energy position of near-band-edge emission spectra of InN epitaxial layers with different doping levels," Phys. Rev. B 69, 115216 (2004).
Berggren, K.F. and Sernelius, B.E., "Band-gap narrowing in heavily doped many-valley semiconductors," Phys. Rev. B 24, 1971 (1981).
Brodsky, M.H. and Title, R.S., "Electron Spin Resonance in Amorphous Silicon, Germanium, and Silicon Carbide," Phys. Rev. Lett. 23, 581 (1969).
Cuong, T.V., Pham, V.H., Tran, Q.T., Hahn, S.H., Chung, U.S., Shin, E.W., and Kim, E.J., "Photoluminescence and Raman studies of graphene thin films prepared by reduction of graphene oxide," Materials Letters 64, 399 (2010).
Davydov, V.Y., Klochikhin, A.A., Emtsev, V.V., Smirnov, A.N., Goncharuk, I.N., Sakharov, AV., Kurdyukov, D.A., Baidakova, M.V., Vekshin, V.A., Ivanov, S.V., Aderhold, J., Graul, J., Hashimoto, A., and Yamamoto, A., "Photoluminescence and Raman study of hexagonal InN and In-rich InGaN alloys," Physica Status Solidi (b) 240, 425 (2003).
D'Innocenzo, V., Srimath Kandada, A.R., De Bastiani, M., Gandini, M., and Petrozza, A., "Tuning the Light Emission Properties by Band Gap Engineering in Hybrid Lead Halide Perovskite," J. Am. Chem. Soc. 136, 17730 2014).
Dixit, V., Rodrigues, B., Bhat, H., Venkataraghavan, R., Chandrasekaran, K., and Arora, B., "Growth of InSb epitaxial layers on GaAs (001) substrates of LPE and their characterizations," Journal of Crystal Growth 235, 154 (2002).
T.M. Birshtein and P.M. Luisi, "Conformation of optically active isotactic macromolecules," Vysokomol. Soedin. Polymer Science, vol. 6, 1238 (1964).
Calvo, F. et al., "Non-magnetic photospheric bright points in 3D simulations of the solar atmosphere," Astronomy & Astrophysics, vol. 596, id A43, Nov. 2016, 10 pages.
Zhao, Junwei et al., "Tracing p-Mode Waves From the Photosphere to the Corona in Active Regions," The Astrophysical Journal Letters, 830:L 17, Oct. 10, 2016, 7 pages.
Aghanim, N. et al., 2018 results—I. Overview and the cosmological legacy of Planck, Astronomy & Astrophysics 641, A1 (2020), publisher: EDP Sciences, 56 pages.
Aghanim, N.; "Planck 2018 results—VI. Cosmological parameters," Astronomy & Astrophysics 641, A6 (2020), publisher: EDP Sciences.
Grundy, W.M. et al., "Surface compositions across Pluto and Charon," Science 351, 10.1126/science.aad9189 (2016), publisher: American Association for the Advancement of Science.
Jarrett, T., "Large Scale Structure in the Local Universe," Tile 2MASS Galaxy Catalog, Publications of the Astronomical Society of Australia 21, 396 (2004), 6 pages.
R. A. et al., The sixteenth data release of the sloan digital sky surveys: First release from the apogee-2 southern survey and full release of eboss spectra (2019), 22 pages.
Ulrich, RK., "The Five-Minute Osciliations on the Solar Surface," The Astrophysical Journal 162,993 (1970).
Updated Recommendations for the Use of Typhoid Vaccine Advisory Committee on Immunization Practices, United States, 2015, 6 pages.
Zhang, H. et al., "Efficient Neural Network Robustness Certification with General Activation Functions," in Advances in Neural Information Processing Systems 31, edited by S. Bengio, H. Wallach, H. Larochelle, K. Grauman, N. Cesa-Bianchi, and R. Garnett (Curran Associates, Inc., 2018) pp. 4939-4948, 10 pages.

(56) References Cited

OTHER PUBLICATIONS

Ziethlow, V. et al., "Assessment by electron-microscopy of recombinant Vibrio cholerae and *Salmoneila* vaccine strains expressing enterotoxigenic *Escherichia coli*-specific surface antigens," Clinical Microbiology and Infection 14, 282 (2008), 5 pages.
A. Rössler, D. Cozzolino, L. Verdoliva, C. Riess, J. Thies, and M. Nießner, "FaceForensics++: Learning to Detect Manipulated Facial Images," 2019.
D. M. Montserrat et al., "Deepfakes Detection with Automatic Face Weighting," 2020 IEEE/CVF Conference on Computer Vision and Pattern Recognition Workshops (CVPRW), Seattle, WA, USA, 2020, pp. 2851-2859, doi: 10.1109/CVPRW50498.2020.00342.
ISR for PCT/US23/24135 dated Sep. 7, 2023.
K. Taya, N. Kuroki, N. Takeda, T. Hirose and M. Numa, "Detecting tampered regions in JPEG images via CNN," 2020 18th IEEE International New Circuits and Systems Conference (NEWCAS), Montreal, QC, Canada, 2020, pp. 202-205, doi: 10.1109/NEWCAS49341.2020.9159761.
Kohli, & Gupta, A. (2021). Detecting DeepFake, FaceSwap and Face2Face facial forgeries using frequency CNN. Multimedia Tools and Applications, 80(12), 18461-18478. https://doi.org/10.1007/s11042-020-10420-8.
Mazaheri, G., Roy-Chowdhury, A. K. (2022). Detection and localization of facial expression manipulations. 2022 IEEE/CVF Winter Conference on Applications of Computer Vision (WACV). https://doi.org/10.1109/https://doi.org/10.1109/wacv51458.2022.00283.
S. Agarwal, H. Farid, O. Fried and M. Agrawala, "Detecting Deep-Fake Videos from Phoneme-Viseme Mismatches," 2020 IEEE/CVF Conference on Computer Vision and Pattern Recognition Workshops (CVPRW), Seattle, WA, USA, 2020, pp. 2814-2822, doi: 10.1109/CVPRW50498.2020.00338.
Sun, Y., Zhang, Z., Qiu, C., Wang, L., Sun, L., Wang, Z. (2022). Faketransformer: Exposing face forgery from spatial-temporal representation modeled by facial pixel variations. 2022 7th International Conference on Intelligent Computing and Signal Processing (ICSP). https://doi.org/10.1109/icsp54964.2022.9778420.
Z. Zhang, C. Mal, B. Ding and M. Gao, "Detecting Manipulated Facial Videos: A Time Series Solution," 2020 25th International Conference on Pattern Recognition (ICPR), Milan, Italy, 2021, pp. 2817-2823, doi: 10.1109/ICPR48806.2021.9412610.
C. Ciszak et al., "Raman spectra analysis of ZrO2 thermally grown on Zircaloy substrates irradiated with heavy ion: Effects of oxygen isotopic substitution," Journal of Raman Spectroscopy, vol. 50, No. 3, pp. 425-435, 2019.
C. Zhang et al., "Ionic conductivity and its temperature dependence of atmospheric plasmasprayed yttria stabilized zirconia electrolyte," Materials Science and Engineering: B, vol. 137, No. 1, pp. 24-30, Feb. 2007.
Chen, X.J., et al. "Influence of microstructure on the ionic conductivity of yttria-stabilized zirconia electrolyte." Materials Science and Engineering A vol. 335 p. 246-252 [online]. Sep. 25, 2002 (Sep. 25, 2002) (retrieved on Aug. 2, 2023) Retrieved from the Internet: <URL: https://www.sciencedirect.com/science/article/abs/pii/S0921509301019359> <DOI: 10.1016/S0921-5093(01)01935-9>.
D. Chen, S. Su, Z. Yu and L. Lu, "Geometrical Optimization of the Composite Cathode in a Solid Oxide Fuel Cell," 2011 Asia-Pacific Power and Energy Engineering Conference, Wuhan, China, 2011, pp. 1-4, doi: 10.1109/APPEEC.2011.5748908.
F. T. Ciacchi, K. M. Crane, and S. P. S. Badwal, "Evaluation of commercial zirconia powders forsolid oxide fuel cells," Solid State Ionics, vol. 73, No. 1, pp. 49-61, Oct. 1994.
Feng, X., Chien, P.-H., Wang, Y., Patel, S., Wang, P., Liu, H., Immediato-Scuotto, M., Hu, Y.-Y. (2020). Enhanced ion conduction by enforcing structural disorder in Li-deficient argyrodites li6-xps5-xcl1+x. Energy Storage Materials, 30, 67-73. https://doi.org/10.1016/j.ensm.2020.04.042.
Gamon, J., Dyer, M. S., Duff, B. B., Vasylenko, A., Daniels, L. M., Zanella, M., Gaultois, M. W., Blanc, F., Claridge, J. B., Rosseinsky, M. J. (2021). Li4.3als3.3cl0.7: A sulfide-chloride lithium ion conductor with highly disordered structure and increased conductivity. Chemistry of Materials, 33(22), 8733-8744. https://doi.org/10.1021/acs.chemmater.1c02751.
Garcia-Barriocanal, J., Rivera-Calzada, A., Varela, M., Sefrioui, Z., Díaz-Guillén, M.R., Moreno, K.J., Díaz-Guillén, J. A., Iborra, E., Fuentes, A.F., Pennycook, S.J., Leon, C. and Santamaria, J. (2009), Tailoring Disorder and Dimensionality: Strategies for Improved Solid Oxide Fuel Cell Electrolytes. ChemPhysChem, 10: 1003-1011. https://doi.org/10.1002/cphc.200800691.
Hattori et al., "Change in Conductivity of Yttria Stabilized Zirconia," Journal of the Japan Society of Powder and Powder Metallurgy, vol. 50, No. 4, pp. 297-301, 2003.
Hu, N., Khan, M., Wang, Y., Song, X., Lin, C., Chang, C., Zeng, Y. (2017). Effect of microstructure on the thermal conductivity of plasma sprayed Y2O3 stabilized zirconia (8% YSZ). Coatings, 7(11), 198. https://doi.org/10.3390/coatings7110198.
I. R. Gibson, G. P. Dransfield, and J. T. S. Irvine, "Sinterability of commercial 8 mol% yttriastabilized zirconia powders and the effect of sintered density on the ionic conductivity," Journal of Materials Science, vol. 33, No. 17, pp. 4297-4305, Sep. 1998.
ISR for PCT/US23/24243 dated Sep. 8, 2023.
O. H. Kwon et al., "Investigation of the electrical conductivity of sintered monoclinic zirconia (ZrO2)," Ceramics International, vol. 43, No. 11, pp. 8236-8245, Aug. 2017.
Tu, Z., Tian, Y., Liu, M., Jin, B., Akbar, M., Mushtaq, N., Wang, X., Dong, W., Wang, B., Xia, C. (2021). Remarkable ionic conductivity in a LZO-SDC composite for low-temperature solid oxide fuel cells. Nanomaterials, 11 (9), 2277. https://doi.org/10.3390/nano11092277.
Wohlmuth, D., Epp, V., Bottke, P., Hanzu, I., Bitschnau, B., Letofsky-Papst, I., Kriechbaum, M., Amenitsch, H., Hofer, F., Wilkening, M. (2014). Order vs. disorder—a huge increase in ionic conductivity of nanocrystalline LiAIO_2 embedded in an amorphous-like matrix of lithium aluminate. J. Mater. Chem. A, 2(47), 20295-20306. https://doi.org/10.1039/c4ta02923b.
Y.-Z. Xing, C.-J. Li, Q. Zhang, C.-X. Li, and G.-J. Yang, "Influence of Microstructure on the Ionic Conductivity of Plasma-Sprayed Yttria-Stabilized Zirconia Deposits," Journal of the American Ceramic Society, vol. 91, No. 12, pp. 3931-3936, 2008.
Fogal, B., O'Leary, S., Lockwood, D., Baribeau, J.-M., Noel, M., and Zwinkels, J., "Disorder and the optical properties of amorphous silicon grown by molecular beam epitaxy," Solid State Communications 120, 429 2001).
Geim, A.K. and Novoselov, K.S., "The rise of graphene," Nature Matter 6, 183 (2007).
Guo, Q., Kusunoki, Y., Ding, Y., Tanaka, T., and Nishio, M., "Properties of InGaN Films Grown by Reactive Sputtering," Japanese Journal of Applied Physics 49, 081203 (2010).
Kalt, H. and Rinker, M., "Band-gap renormalization in semiconductors with multiple inequivalent valleys," Phys. Rev. B 45, 1139 (1992).
Kong, L., Liu, G., Gong, J., Hu, Q., Schaller, R.D., Dera, P., Zhang, D., Liu, Z., Yang, W., Zhu, K., Tang, Y., Wang, C., Wei, S.-H., Xu, T., and Mao, H.-K., "Simultaneous band-gap narrowing and carrier-lifetime prolongation of organic-inorganic trihalide perovskites," Proceedings of the National Academy of Sciences 113, 8910 (2016), https://www.pnas.org/content/113/32/8910.full.pdf.
Laaziri, K., Kycia, S., Roorda, S., Chicoine, M., Robertson, J.L., Wang, J., and Moss, S.C., "High Resolution Radial Distribution Function of Pure Amorphous Silicon," Phys. Rev. Lett. 82, 3460 (1999).
Lockwood, D.J. and Wang, A.G., "Quantum confinement induced photoluminescence in porous silicon," Solid State Communications 94, 905 (1995).
Makin, Robert A., Quantification and Influence of Cation Sublattice Disorder in Ternary Materials With Specific Application to SnSnN2, Western Michigan University, 2019.
Manser, J.S. and Kamat, P.V., "Band filling with free charge carriers in organometal halide perovskites," Nature Photonics 8, 737 (2014).
Meher, S.R., Biju, K.P., and Jain, M.K., "Raman spectroscopic investigation of phase separation and compositional fluctuations in nanocrystalline InGa1xN thin films prepared by modified activated reactive evaporation," Physica Status Solidi (a) 208, 2655 (2011).

(56) References Cited

OTHER PUBLICATIONS

Perez, J.M., Villalobos, J., Mcneill, P., Prasad, J., Cheek, R., Kelber, J., Estrera, J.P., Stevens, P. D., and Glosser, R., "Direct evidence for the amorphous silicon phase in visible photoluminescent porous silicon," Applied Physics Letters 61,563 (1992).
Potts, R.B., "Some generalized order-disorder transformations," Mathematical Proceedings of the Cambridge Philosophical Society 48, 106 (1952).
Prokes, S.M. and Glembocki, O.J., "Role of interfacial oxide-related defects in the red-light emission in porous silicon," Phys. Rev. B 49, 2238 (1994).
Robins, L., Paul, A., Parker, C., Roberts, J., Bedair, S., Piner., E., and El-Masry, N., "Optical Absorption Raman, and Photoluminescence Excitation Spectroscopy of Inhomogeneous InGaN Films," MRS Proceedings 537, 33.22 (1998).
Senthilkumar, V., Venkatachalam, S., Viswanathan, C., Gopal, S., Narayandass, S.K., Mangalaraj, D., Wilson, K.C., and Vijayakumar, K.P., "Influence of substrate temperature on the properties of ,vacuum evaporated InSb films," Crystal Research and Technology 40, 573 (2005).
Sokolov, A.P., Shebanin, A.P., Golikova, O.A., and Mezdrogina, M.M., "Structural disorder and optical gap fluctuations in amorphous silicon," Journal of Physics: Condensed Matter 3, 9887 (1991).
Sood, A.K., Jayaram, K., and Muthu, D.V.S., "Raman and high-pressure photoluminescence studies on porous silicon," Journal of Applied Physics 72, 4963 (1992).
Tanino, H., Kuprin, A., Deai, H., and Koshida, N., "Raman study of free-standing porous silicon," Phys. Rev. B 63, 1937 (1996).
Tsu, R., Shen, H., and Dutta, M., "Correlation of Raman and photoluminescence spectra of porous silicon," Applied Physics Letters 60, 112 (1992).
Ising E:, "Beitrag zur Theorie des Ferromagnetismus," Zeitschrift fOr Physik 32 (1924), 6 pages.
Warren, 8., "X-Ray Diffraction," Dover Books on Physics (Dover, New York, 2012), 74 pages.
European Commission, DG Enterprise and Industry, "Critical raw materials for the EU Report of the Ad-hoc Working Group on defining critical raw materials", European Commission, Jul. 30, 2010, 84 pages.
Fateley et al., "Practical Methods for Selection Rules" (pp. 1-42 of this book originally appeared as "Infrared and Raman Selection Rules for Molecular and Lattice Vibrations: The Correlation Method," Wiley-Interscience, New York (1972), 33 pages.
Chimiya, A. and Cohen, P., "Kinematic Electron Diffraction," Cambridge University Press, Cambridge, England, 2004, 23 pages.
Ising et al., "The Fate of Ernst Ising and the Fate of his Model," Jun. 6, 2017, 46 pages.
Kochmanski, Martin S. Note On the E. Ising's Paper, Bitrag Zur Theorie Des Ferromagnetismus, Feb. 13, 2008, 4 pages.
Makin et al., "Supplementary Information for Alloy-Free Band Gap Tuning Across the Visible Spectrum," at least as early as Jun. 27, 2019, 6 pages.
Wikipedia, "Ising model," Last edited on Apr. 4, 2022, 29 pages.
Zhao, Q., Potter, C.S., Carragher, B., Lander, G., Sworen, J., Towne, V. et al., "Characterization of virus-like particles in GARDASIL by cryo transmission electron microscopy," Human Vaccines & Immunotherapeutics, Mar. 2014, 10(3), pp. 734-9.
Boigard, H., Alimova, A., Martin, G.R, Katz, A., Gottlieb, P., Galarza, J.M., "Zika virus-like particle (VLP) based vaccine," PLOS Negl. Trop. Dis., May 2017, 11(5):e0005608.
Bonnez, W. et al., "Isolation and propagation of human papillomavirus type 16 in human xenografts implanted in the severe combined immunodeficiency mouse," J_ Virol., 72, pp. 5256-5261, 1998.
Carter, C.B. and Williams, D.B. (Eds.), "Transmission Electron Microscopy: Diffraction, Imaging, and Spectrometry," Springer International Publishing, 2016, Available from: https://www_springer.com/gp/book/9783319266497.

CDC, "H1N1 Flu," Images of the H1N1 Influenza Virus, at least as early as May 6, 2019, Available from: https://www.cdc.gov/h1n1flu/images_htm?s_cid=cs_001.
Chan, W., Zhou, H., Kemble, G., Jin, H., "The cold adapted and temperature sensitive influenza A/Ann Arbor/6/60 virus, the master donor virus for live attenuated influenza vaccines, has multiple defects in replication at the restrictive temperature," Virology, Oct. 25, 2008, vol. 380(2), pp. 304-311.
Chua, K., Mee Hoo Wong, E., Cropp, B., Hyatt, A., "Role of electron microscopy in Nipah virus outbreak investigation ind control," The Medical Journal of Malaysia, Jun. 2, 2007, vol. 62, pp. 139-142.
Cohen, K. W. and Frahm, N., "Current views on the potential for development of a HIV vaccine," Expert Opinion Biological Therapy, 17:3, pp. 295-303, 2017.
Cullity, B.D., "Elements of x-ray diffraction," Addison-Wesley Publishing Company, Inc., 1978.
Cunha, A.J.L.A. da, de Magalhaes-Barbosa, M.C., Lima-Setta, F., Medronho, R. de A., Prata-Barbosa, A., "Microcephaly Case Fatality Rate Associated with Zika Virus Infection in Brazil: Current Estimates," Pediatr. Infect. Dis J., 2017, vol. 36(5), pp. 528-530.
Eckert, A., Higgins, D., MAMS, CDC, "Illustration of a Coronavirus," Public Health Image Library, 2020, Available from: https://phil.cdc.gov/details .aspx?pid=23312.
Fibriansah, G., Ng, T-S., Kostyuchenko, V.A., Lee, J., Lee, S., Wang, J. et al., "Structural Changes in Dengue Virus When Exposed to a Temperature of 37° C.," Journal of Virology, Jul. 2013, vol. 87(13), pp. 7585-7592.
Gels, T., Schagger, H. and von Jagow, G., "Tricine-sodium dodecyl sulfate-polyacrylamide gel electrophoresis for the separation of proteins in the range from 1 to 100 kDa," Anal. Biochem., vol. 166, pp. 368-379, 1987.
Hierholzer, J.C. and Kabara, J. J., "In Vitro Effects of Monolaurin Compounds on Enveloped RNA and DNA Viruses," Journal of Food Safety, vol. 4, pp. 1-12, 1982.
Hyatt, A.D., Zaki, S.R., Goldsmith, C.S., Wise, T.G., Hengstberger, S.G., "Ultrastructure of Hendra virus and Nipah virus within cultured cells and host animals," Microbes and Infection, Apr. 2001, 1 ;3(4), pp. 297-306.
Jordan, D., CDC, "3D rendering of a whole influenza (flu) virus," Public Health Image Library, 2019, Available from: https://phil.cdc.gov/Details.aspx?pid=23227.
Kenmoe, S., Demanou, M., Bigna, J.J., Nde Kengne, C., Fatawou Modiyinji, A., Simo, F.B.N. et al., "Case fatality rate and risk factors for Nipah virus encephalitis: A systematic review and meta-analysis," J. Clin. Virol., 2019, vol. 117, pp. 19-26.
Landau, L.D., "On the Theory of Phase Transitions," Zh. Esksp. Teor. Fiz. 7, pp. 19-32, 1937.
Monaghan, P., Green, D., Pallister, J., Klein, R., White, J., Williams, C. et al., "Detailed morphological characterisation of Hendra virus infection of different cell types using super-resolution and conventional imaging, " Virology Journal, Nov. 27, 2014, 11:200, pp. 1-12.
Monath, T.P., "Treatment of yellow fever," Antiviral Research, vol. 78, pp. 116-124, 2008.
National Center for Emerging and Zoonotic Infectious Diseases, "Hendra Virus Disease (HeV)," Feb. 2021, Available from: https://www.cdc.gov/vhf/hendra/pdf/factsheet.pdf.
NIAID, "1918 H1N1 Virus Particles," 2018, Available from: https://www.flickr.com/photos/niaid/30012820867/.
NIAID, "Zika Virus," 2016, Available from: https://www.flickr.com/photos/niaid/27023892862/.
Nickol, M.E. and Kindrachuk, J., "A year of terror and a century of reflection: perspectives on the great influenza pandemic of 1918-1919," BMC Infectious Diseases, Feb. 6, 2019, vol. 19:117, 10 pages.
Pankrac, J., Klein, K., Mckay, p. F., King, D.F.L., Bain, K., Knapp, J. et al., "A heterogeneous human immunodeficiency virus-like particle (VLP) formulation produced by a novel vector system," NPJ Vaccines, Jan. 19, 2018, 3(1), pp. 1-10.
Rerks-Ngarm, S., Pitisuttithum, P., Nitayaphan, S., Kaewkungwal, J., Chiu, J., Paris, R. et al., "Vaccination with ALVAC and AIDSVAX to prevent HIV-1 infection in Thailand," The New England Journal of Medicine, Dec. 3, 2009, vol. 361 (23), pp. 2209-2220.

(56) References Cited

OTHER PUBLICATIONS

Salinas, J.D. and Steiner, M.L., "West Nile Virus: Practice Essentials," Pathophysiology, Epidemiology, Medscape, Apr. 23, 2020 [cited May 5, 2020], Available from: https://emedicine.medscape.com/article/312210-overview.

Schiller, J. and Chackerian, B., "Why HIV Virions Have Low Numbers of Envelope Spikes: Implications for Vaccine Development," PLOS Pathog [Internet], Aug. 7, 2014 [cited May 5, 2020), vol. 10(8), Available from: https://www.ncbi.nlm.nih.gov/pmc/articles/PMC4125284/.

Science Source, "H3N2, Hong Kong Flu Virus," TEM, at least as early as May 6, 2019, Available from: https://www.sciencesource.com/CS.aspx?VP3=SearchResult&ITEMID=SS2760545.

Science Source, "H5N1, Influenza A, Avian Flu Virus," TEM, at least as early as May 6, 2019, Available from: https://www.sciencesource.com/CS.aspx?VP3=SearchResult&VBID=2OPESQLF1 KBWQ&SM LS= 1 &RW=1920&RH=966#/.

Science Source, "HIV-1, Human Immunodeficiency Virus," TEM, at least as early as May 6, 2019, Available from: https://www.sciencesource.com/archive/HIV-1-Human-Immunodeficiency-Virus-TEM-SS2760525.html.

Science Source, "West Nile Virus," TEM, at least as early as May 6, 2019, Available from: https://www.sciencesource. -com/archive/West-Nile-Virus-TEM-SS28384 79.html.

Smith, G.E., Sun, X., Bai, Y., Liu, Y.V., Massare, M.J., Pearce, M.B. et al., "Neuraminidase-based recombinant virus-like particles protect against lethal avian influenza A(H5N1) virus infection in ferrets," Virology, 2017, pp. 509:90-7.

Taubenberger, J.K. and Morens, D.M., "1918 Influenza: the Mother of All Pandemics," Emerging Infectious Diseases Journal—CDC, vol. 12, No. 1, Jan. 2006, pp. 15-22, Available from: https://wwwnc.cdc.gov/eid/article/12/1 /05-0979 article.

TEM of HIV-antigen AIDS vaccine from yeast, Stock Image—G255/0040, Science Photo Library, at least as early as May 6, 2019, Available from: https://www.sciencephoto.com/media/211839/view/tem-of-hiv-antigen-aids-vaccine-from-veast.

Thanh Hung, N. and Trong Lan, N., "Improvement of Case-Management—A Key Factor to Reduce Case-Fatality Rate of Dengue Haemorrhagic Fever in Southern Viet Nam," Dengue Bulletin, vol. 27, 2003 [cited May 5, 2020], pp. 144-148, Available from: https://apps.who.int/iris/handle/10665/163789.

WHO Department of Communicable Disease Surveillance and Response, "Consensus document on the epidemiology of severe acute respiratory syndrome (SARS)," WHO Dept of Communicable Disease Surveillance and Response, 2003, Available from: www.who.int/csr/sars/en/WHOconsensus.pdf.

WHO Director-General's opening remarks at the media briefing on COVID-19, Mar. 3, 2020, Available from: https://www.who.int/dg/speeches/detail/who-director-general-s-opening-remarks-at-the-media-briefing-on-covid-19.

Who, "FAQs: H5N1 influenza," WHO, at least as early as May 6, 2019, Available from: https://www.who.int/influenza/human_animal_interface/avian_influenza/h5n1_research/faqs/en/.

WHO, "Middle East respiratory syndrome coronavirus (MERS-CoV)," WHO, Mar. 15, 2021, Available from: http://www.who.int/emergencies/mers-cov/en/.

Yellow Fever Virus, TEM—Stock Image—C036/7398, Science Photo Library, at least as early as May 6, 2019, Available from: https://www.sciencephoto.com/media/864658/view/yellow-fever-virus-tem.

Yu, I-M, Zhang, W., Holdaway, H.A., Li, L., Kostyuchenko, V.A., Chipman, P.R. et al., "Structure of the immature dengue virus at low pH primes proteolytic maturation," Science, Mar. 28, 2008, vol. 319(5871), pp. 1834-1837.

Zhang, X., Sheng, J., Plevka, P., Kuhn, R.J., Diamond, M.S., Rossmann, M.G., "Dengue structure differs at the temperatures of its human and mosquito hosts," Proc. Natl. Acad. Sci., Apr. 23, 2013, vol. 110(17), pp. 6795-6799.

Lany, S., Fioretti, A.N., Zawadzki, P.P., Schelhas, L.T., Toberer, E.S., Zakutayev, A., and Tamboli, A.C., "Monte Carlo simulations of disorder in ZnSnN2 and the effects on the electronic structure," Phys. Rev. Mater. 1 (2017).

Makin, Robert A. et al., "Quantitative Disorder Analysis of Physical Systems Across Length Scales," Western Michigan University, Kalamazoo, Michigan, Mar. 17, 2020.

Austin, I., Goodman, C., and Pengelly, A., "New Semiconductors with the Chalcopyrite Structure," J. Electrochem. Soc. 103, 609 (1956).

Chen, S., Narang, P., Atwater, H.A., and Wang, L., "Phase Stability and Defect Physics of a Ternary ZnSnN2 Semiconductor: First Principles Insights," Adv. Mater. 26, 311 (2014).

Du, K., Bekele, C., Hayman, C.C., Angus, J.C., Pirouz, P. and Kash, K., "Synthesis and characterization of ZnGeN2 grown from elemental Zn and Ge sources," J. Cryst. Growth 310, 1057 (2008).

Fioretti, A.N., Zakutayev, A., Moutinho, H., Melamed, C., Perkins, J.D., Norman, A.G., Al-Jassim, M., Toberer, E.S., iind Tamboli, A.G., "Combinatorial insights into doping control and transport properties of zinc tin nitride," J. Mater. Chem. C 3, 11017 (2015).

Goodman, C. and Douglas, R., "New semiconducting compounds of diamond type structure," Physica 20, 1107 (1954).

Goodman, C.H. L., "A New Group of Compounds with Diamond type (Chalcopyrite) Structure," Nature 179,828 (1957).

Heyd, J., Scuseria, G.E., and Emzerhof, M., "Hybrid functionals based on a screened Coulomb potential," J. Chem. Phys., vol. 118, pp. 8207-8215 (2003).

Iliopoulos, E., Adikimenakis, A., Dimakis, E., Tsagaraki, K., Konstantinidis, G., and Georgakilas, A., "Active nitrogen species dependence on radiofrequency plasma source operating parameters and their role in GaN growth," J. Cryst. Growth, 278, 426 (2005).

Jaffe, J. and Zunger, A., "Anion displacements and the band-gap anomaly in ternary ABC2 chalcopyrite semiconductors," Phys. Rev. B, vol. 27, pp. 5176-5179 (1983).

Koblmuller, G., Gallinat, C., and Speck, J., "Surface kinetics and thermal instability of N-face InN grown by plasma-assisted molecular beam epitaxy," J. Appl. Phys. 101, 083516 (2007).

Lambrecht, W.R., Alldredge, E., and Kim, K., "Structure and phonons of ZnGeN2," Phys. Rev. B 72, 155202 (2005).

Larson, W.L., Maruska, H.P., and Stevenson, DA, "Synthesis and Properties of ZnGeN2," J. Electrochem. Soc., vol. 121, 1673 (1974).

Martinez, A.M., Arriaga, L.G., Fernandez, A.M., and Cano, U., "Band edges determination of CuInS2 thin films prepared by electrodeposition," Mater. Chem. Phys., vol. 88, pp. 417 (2004).

Narang, P., Chen, S., Coronel, N.C., Gui, S., Yano, J., Wang, L., Lewis, N.S., and Atwater, H.A., "Bandgap Tunability In Zn(Sn,Ge)N2 Semiconductor Alloys," Adv. Mater. 26, 1235 (2014).

Paudel, T.R. and Lambrecht, W.R., "First-principles calculation of the zone center phonons in ZnSiN2: Comparison With infrared data," Phys. Rev. B 76, 115205 (2007).

Paudel, T.R. and Lambrecht, W.R., "First-principles calculations of elasticity, polarization-related properties, and nonlinear optical coefficients in Zn—IV—N2 compounds," Phys_ Rev. B, vol. 79, 245205 (2009).

Prabukanthan, P. and Dhanasekaran, R., "Growth of CuGaS2 Single Crystals by Chemical Vapor Transport and Characterization," Cryst. Growth Des. 7, 618 (2007).

Punya, A., Lambrecht, W.R., and van Schilfgaarde M., "Quasiparticle band structure of Zn—IV—N2 compounds," Phys. Rev. B 84, pp. 16520401-165204-10 (2011).

Qi, Y., Liu, Q., Tang, K., Liang, Z., Ren, Z., and Liu, X., "Synthesis and Characterization of Nanostructured Wurtzite CuInS2: A New Cation Disordered Polymorph of CuInS2," J. Phys. Chem. C 113, 3939 (2009).

Quayle, P.C., Blanton, E.W., Punya, A., Junno, G.T., He, K., Han, L., Zhao, H., Shan, J., Lambrecht, W.R.L., and Kash, K., "Charge-neutral disorder and polytypes in heterovalent wurtzite-based ternary semiconductors: The Importance of the octet rule," Phys_ Rev. B 91, pp. 205207-01-20507-14 (2015).

Quayle, P.C., He, K., Shan, J. and Kash, K., "Synthesis, lattice structure, and band gap of ZnSnN2," MRS Commun. 3, 135 (2013).

(56) References Cited

OTHER PUBLICATIONS

Scanlon, O. and Walsh, A., "Bandgap engineering of ZnSnP2 for high-efficiency solar cells," Appl. Phys. Lett. 100, 251911 (2012).
Van de Walle, A., Tiwary, P., de Jong, M., Olmsted, D., Asta, M., Dick, A., Shin, D., Wang, Y., Chen, L.-Q., and Liu, Z.-K., "Efficient stochastic generation of special quasirandom structures," CALPHAD: Comput. Coupling Phase Diagrams Thermo-chem., vol. 42, pp. 13-18 (2013).
Veal, T.D., Feldberg, N., Quackenbush, N.F., Linhart, W.M., Scanlon, D.O., Piper, L.F., and Durbin, S.M., "Band Gap Dependence on Cation Disorder in ZnSnN2 Solar Absorber," Adv. Energy Mater. 5, 1501462 (2015).
Viennois, R., Taliercio, T., Potin, V., Errebbahi, A., Gil, B., Charar, S., Haidoux, A., and Tedenac, J.S., "Prospective Investigations of orthorhombic ZnGeN2: synthesis, lattice dynamics and optical properties," Mater. Sci. Eng. B 82, 45 (2001).
Wang, T., Ni, C., and Janotti, A., "Band alignment and p-type doping of ZnSnN2," Phys. Rev. B 95, pp. 205205-1-205205-6 (2017).
Zunger, A., Wei, S.-H., Ferreira, L.G., and Bernard, J.E., "Special quasirandom structures," Phys. Rev. Lett. 65, 353 (1990).

\* cited by examiner

DETECTION OF FACE MANIPULATION BY QUANTIFIED DISORDER MEASUREMENTS

CROSS REFERENCE TO RELATED APPLICATIONS

The present application claims the benefit under 35 USC § 119(e) to U.S. Provisional Patent Application No. 63/348,277, filed Jun. 2, 2022; the entire disclosure of that application is incorporated herein by reference.

TECHNICAL FIELD

The present disclosure relates to systems and methods that may be utilized to detect manipulation or alterations in videos or images, and, in some aspects, face manipulations and/or alterations.

BACKGROUND OF THE INVENTION

An aspect of the present disclosure is a computer-implemented process that may be utilized to detect face manipulation in videos or images. The process involves extraction (measurement) of a disorder parameter (S) or disorder parameter squared ($S^2$) of a video frame or series of frames, or an image or collection of images. This technique/process may be used on videos manipulated by various deep fake methods. The technique/process successfully identifies manipulated images in many or all cases. A technique/process according to the present disclosure is believed to outperform known machine learning-based approaches to face-manipulated videos, which may have difficulty identifying manipulated videos that they were not trained on.

An aspect of the present disclosure is an image-based analysis methodology or process that can accurately distinguish between unaltered and deep fake images in which a person's face has been manipulated.

A technique/process according to an aspect of the present disclosure may begin by measuring (determining) the degree of disorder (e.g., $S^2$) in an entire image including a person's face. The face within the image is then detected and the pixel intensity of the face portion of the image is subtracted from the overall pixel intensity of the image, and the degree of disorder (e.g., $S^2$) of the image is measured (determined) again. The change (difference) in disorder (e.g., $S^2$) between the two images may then be used to determine if the image has been altered or not.

BRIEF SUMMARY OF THE INVENTION

Some aspects of the present invention may include methods of detecting whether a first image contains a region that has been manipulated, methods comprising obtaining a second image, wherein the second image comprises at least a part of the first image, said at least a part of the first image containing the region suspected of being manipulated; determining a numerical value of an order parameter (S or $S^2$) of the second image; determining a numerical value of an order parameter (S or $S^2$) of a third image, the third image comprising the second image with the region suspected of being manipulated removed; and comparing the numerical value of the second image (S or $S^2$) with the numerical value (S or $S^2$) of the third image to determine if the first image has been altered, by reference to a predefined criteria indicative of a manipulated image.

In other aspects, the region suspected of being manipulated may contain a face.

In yet other aspects of the present invention, methods may further comprise converting said a least a part of the second image and/or the third image to grayscale. In others, methods may further comprise selecting a region suspected of being manipulated. In others, methods may further comprise calculating a pixel intensity histogram for each of the second and/or third image.

In other aspects, methods may further comprise calculating initial curve-fitting parameters for two skewed Gaussian curves representing the pixel intensity histogram data for each of the second and/or third image. In some aspects, the two skewed Gaussian curves encode the degree of disorder and order of the image. In yet other aspects, calculating initial curve-fitting parameters for each skewed Gaussian curve uses a stochastic funnel algorithm. In other aspects, Gaussian curve parameters for each of the two Gaussian curves are calculated from said initial curve parameters using the least squares method (LSM).

In yet other aspects of the method of the present invention, methods may further comprise finding an intersection between said two Gaussian curves for each of the second image and/or the third image, and in others, said intersection is found using a root-find algorithm. In others, said root-find algorithm is Newton's method.

In other aspects, methods may further comprise calculating the number of standard deviations that the intersection is away from the center point of the Gaussian that has the higher center points along the pixel intensity axis of the two fitted Gaussian curves for each of the second and/or the third images.

In other aspects, methods may further comprise setting a threshold value, wherein the threshold value is set to the value of the highest center point value minus the floor of said number of standard deviations for each of the second and/or the third images.

In other aspects, methods may further comprise performing a binary threshold on said grayscale image of each of the second and/or the third image and converting to a binary image where a first color represents regions with order below said binary threshold, and a second color represents regions above said binary threshold.

In yet other aspects, methods may further comprise calculating the S or $S^2$ value in each of the second and/or third images by counting the number of pixels with values above said binary threshold in said grayscale image and dividing by the total number of pixels in said grayscale image. In others, said calculating the S or $S^2$ value in each of the second and/or third images comprises calculating an S or $S^2$ value for each of the second and third images.

In yet other aspects, said predefined criteria indicative of an altered image comprise a difference in numerical values between the second and third images of 5% or more, 2% or more.

In yet other aspects, said first image is from a single frame of a series of frames comprising a video.

The present invention also includes systems for implementing said methods of detecting whether a first image contains a region that has been manipulated summarized above.

Other features and advantages of the present invention will become apparent from the following detailed description, including the drawings. It should be understood, however, that the detailed description and the specific examples, while indicating preferred embodiments, are provided for illustration only, because various changes and modifications within the spirit and scope of the invention will become apparent to those skilled in the art from the detailed description.

BRIEF DESCRIPTION OF THE DRAWINGS

The present invention(s) are illustrated byway of example and not limitation with reference to the accompanying drawings, in which like references generally indicate similar elements or features.

DETAILED DESCRIPTION

Images that are unaltered have a very small change in disorder (e.g., change in S or $S^2$ parameters) between the image and the image with the face portion subtracted. The change in disorder is typically zero, but it may be somewhat greater than zero (e.g., typically no greater than the thousandths decimal place). In contrast, manipulated images have a change in disorder that is typically at least an entire magnitude higher than unaltered images, which is a disorder difference on the order of magnitude of the tenths decimal place or higher.

Figure 1:
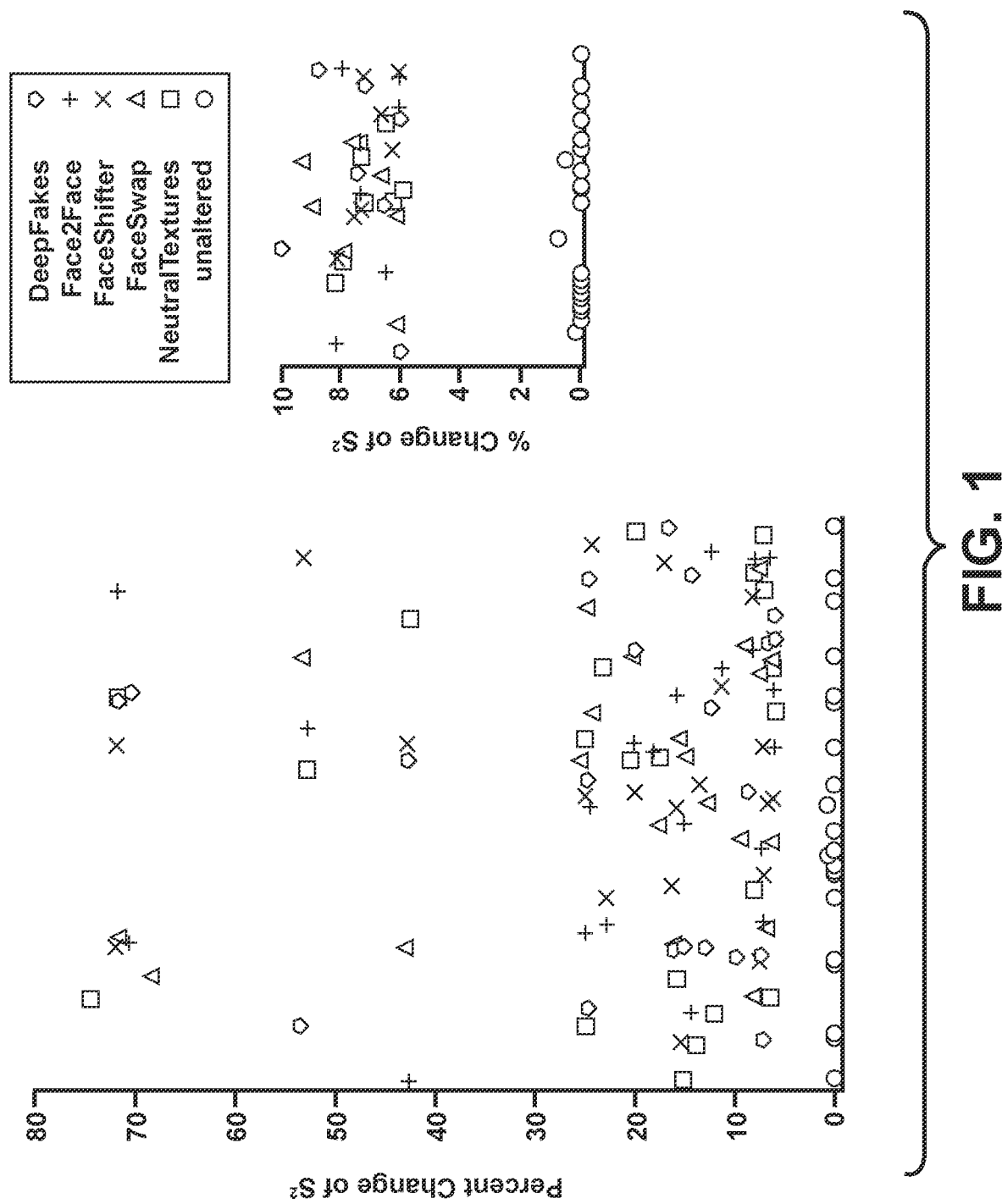
FIG. 1 depicts the percentage change of the degree of disorder ($S^2$) using an example aspect method of the present invention between an entire image and an image with the face subtracted for 126 videos from the FaceForensics database.

This difference in $S^2$ can be seen in FIG. 1, wherein the percentage change of the degree of disorder ($S^2$) between the entire image and the image with the face subtracted is shown for 126 videos from the FaceForensics database. In general, the percent change of $S^2$ of manipulated images is at least about 5%, whereas the percent change of $S^2$ in images that have not been manipulated is about 1% or less. Thus, a predefined criteria based on the difference in order parameter (e.g., $S^2$) can be utilized to determine if an image has been manipulated (altered). For example, the predefined criteria may comprise a difference in order parameter (e.g., $S^2$) of 3%, 4%, 5%, and a difference in order parameter (e.g., $S^2$) of greater than this predefined criteria may be utilized to determine that an image has been manipulated, whereas a difference in order parameter (e.g., $S^2$) of less than this predefined criteria may be utilized to determine that an image has not been manipulated. Alternatively, a range of predefined indeterminate values (e.g., 2%-5%) may be utilized to determine that the manipulation status of an image is indeterminate if the difference in order parameter (e.g., $S^2$) is in the range, whereas an image having a difference in order parameter (e.g., $S^2$) above the high bound of the range has been manipulated, and an image having a difference in order parameter (e.g., $S^2$) below the low bound of the range has not been manipulated.

Figure 2:
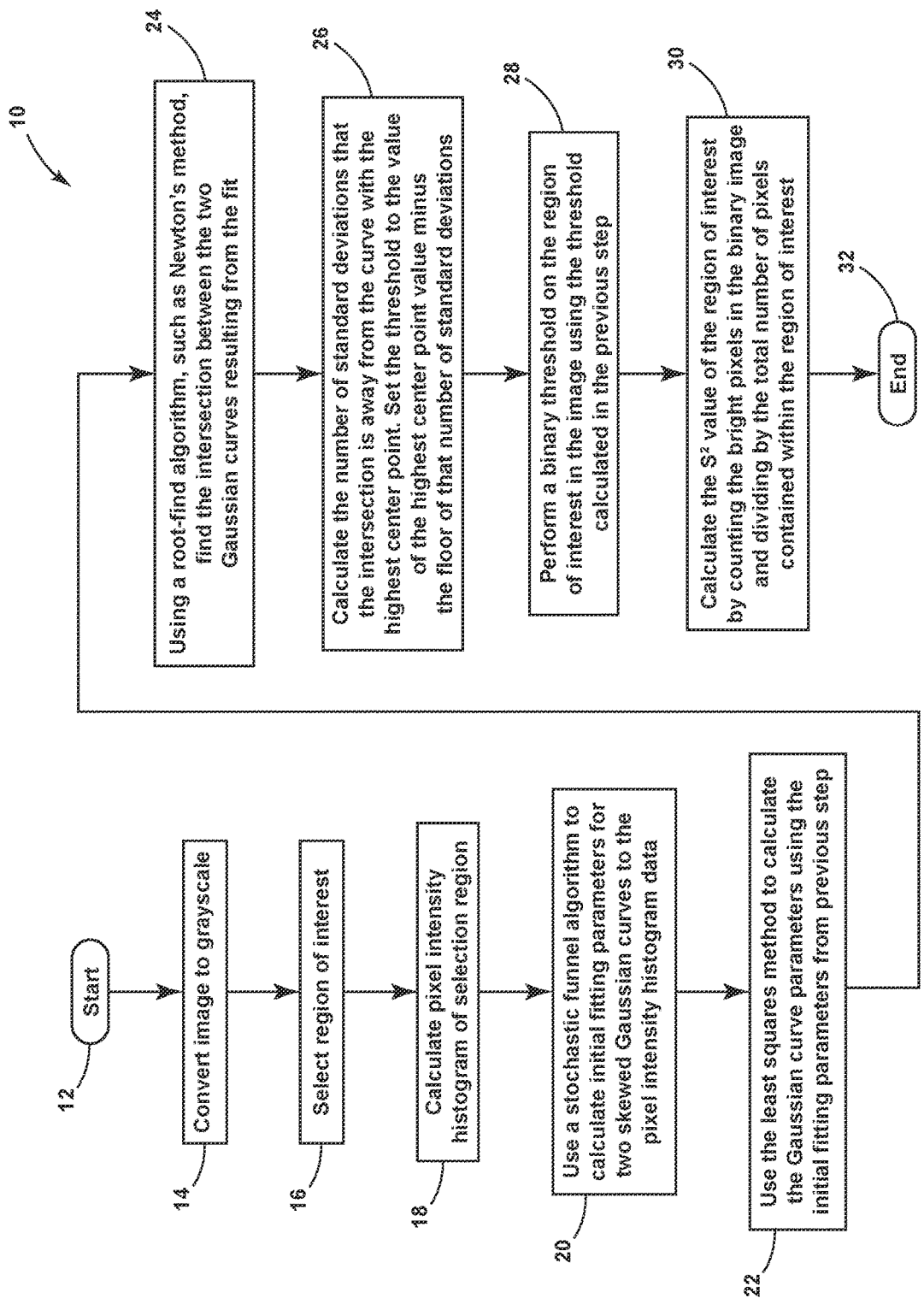
FIG. 2 depicts an example aspect method of the present invention.

FIG. 2 shows an example aspect of the present disclosure, a process 10 for calculating the $S^2$ value of a facial image. It will be understood that one or more steps of process 10 may be implemented utilizing a computer that is configured (e.g., programmed) to execute the steps. Process 10 starts as shown at 12 and proceeds to step 14, which includes converting the image to grayscale. A region of interest may optionally be selected, as shown in step 16. In general, the region of interest may be selected before or after converting an image to grayscale. A region of interest may be selected if, for example, a group image includes numerous faces. The region of interest may comprise a face of interest and a portion of the image around the face of interest.

As used herein, and as is widely known in the art, a "grayscale" image is not limited to black, white and shades of gray, but any conversion process that represents with two different colors the maxima and minima (or potential maxima and minima, such as 0 and 100% in a proportion/percentage value) of an image variable, and intermediate values between represented by gradations of color between the maxima and minima colors chosen.

Figure 3:
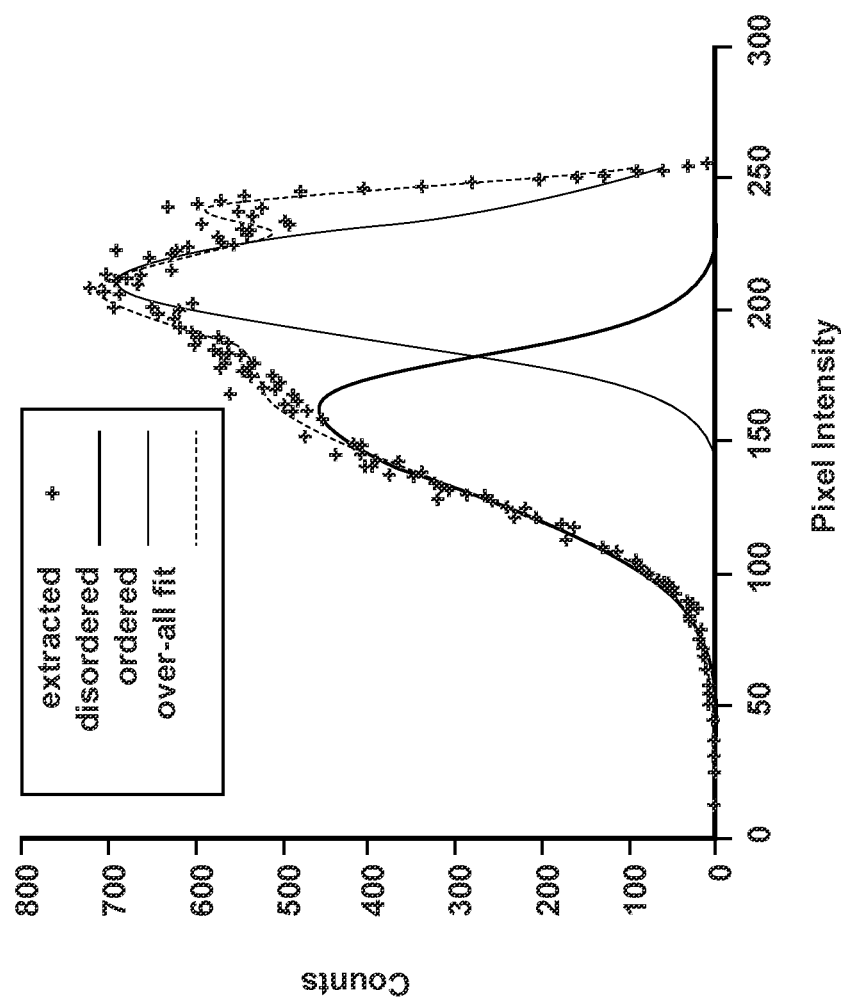
FIG. 3 depicts an example pixel intensity histogram of a region of interest in an example image calculated using an example aspect of a method of the present invention.

The example process 10 further includes calculating a pixel intensity histogram (FIG. 3) of the overall image or a selected region of interest. At step 20, an algorithm (e.g., a stochastic funnel algorithm) is used to calculate initial curve fitting parameters for two skewed Gaussian curves to the pixel intensity histogram data. In the example of FIG. 3, the skewed Gaussian curves are shown as the disordered and ordered curves, and the over-all fit is also shown in FIG. 3. Referring again to FIG. 2, at step 22, the least squares method (LSM) may be used to calculate the Gaussian curve parameters using the initial curve fitting parameters from step 20.

At step 24, a root-finding algorithm (e.g., Newton's method) is used to find the intersection between the two Gaussian curves resulting from the fit. At step 26, a number of standard deviations that the intersection is away from the center point of the Gaussian that has the higher center point along the pixel intensity axis of the two fitted Gaussians is calculated. The threshold value, for which pixel intensities above correspond to order regions of the image and pixel intensities below correspond to disordered regions, is set to the value of the highest center point value minus the floor of that number of standard deviations.

At step 28, a binary threshold is performed on the region of interest in the grayscale image using the threshold calculated in step 26. This results in a black and white image (not shown) with black (dark) and white (bright) regions corresponding to disordered and ordered regions, respectively. At step 30, the squared order parameter ($S^2$) value of the image (or region of interest) is calculated by counting the bright (white) pixels in the binary image and dividing this number by the total number of pixels (white and black) contained with the region of interest. Because the areas of the pixels are the same, the ratio of bright pixels to total pixels is equal to a ratio of the white area to the total area. The method 10 then ends as shown at 32.

Note that the above binary threshold image is discussed in terms of "black" and "white", but any two colors could be chosen, as these colors merely represent states of a variable above or below a certain threshold in an image.

The example process shown in FIGS. 2 and 3 is repeated for an image both with and without the face portion of the image to determine the degree of disorder for both versions of the image. The difference between the order parameters (e.g., $S^2$) for these images is then determined. As discussed above, the difference may optionally be expressed as a percentage change of $S^2$ (see e.g., FIG. 1). If the difference is zero or approximately zero (e.g., thousands decimal place or less, or 1% or less), this indicates that the image was not manipulated. If the difference is significantly greater than zero (e.g., on the order of the tenths decimal place or greater or 5% or greater), the image has likely been manipulated.

In some aspects, the foregoing analysis may be done on part of the image, i.e., the whole image need not be analyzed, as long as the part of the image contains the face part of the image, although care should be taken that a sufficient amount of image remains after the face region is excluded so as to provide a reliable S or $S^2$ value.

It will be understood that a computer may be configured (e.g., programmed) to implement one or more aspects of a process according to the present disclosure. For example, a computer may be configured to determine a difference in an order parameter (e.g., $S^2$) between an entire image and an image in which the face has been removed, and the computer may be configured to generate a message (indicator) that the image has been altered if the difference is greater than a predefined value, and generate a message that the image has not been altered if the difference is less than a predefined criteria. As discussed above, the predefined "altered" criteria and the predefined "not altered" criteria may (optionally) be separated by a range of "indeterminate" criteria. A computer may optionally be configured to generate an "indeterminate" message/signal if the difference is in the predefined indeterminate range.

The above description is considered that of the illustrated embodiments only. Modifications of the processes, materials, and structures will occur to those skilled in the art and to those who make or use image evaluation algorithms for face recognition and other purposes. Therefore, it is understood that the embodiments shown in the drawings and described above are merely for illustrative purposes and not intended to limit the scope of the method which is defined by the following claims as interpreted according to the principles of patent law, including the Doctrine of Equivalents.

In particular, persons of skill in the art would understand that methods of the present invention would not be limited to face recognition and could easily be applied to images with altered regions in general.

What is claimed is:

1. A method of a detecting whether a first image contains a region that has been manipulated, the method comprising:
    obtaining a second image, wherein the second image comprises at least a part of the first image, said at least a part of the first image containing the region suspected of being manipulated;
    determining a numerical value of an order parameter (S or $S^2$) of the second image;
    determining a numerical value of an order parameter (S or $S^2$) of a third image, the third image comprising the second image with the region suspected of being manipulated removed;
    comparing the numerical value of the second image (S or $S^2$) with the numerical value (S or $S^2$) of the third image to determine if the first image has been altered, by reference to a predefined criteria indicative of a manipulated image.

2. The method of claim 1 where the region suspected of being manipulated contains a face.

3. The method of claim 1, further comprising converting said a least a part of the second image and/or the third image to grayscale.

4. The method of claim 1, further comprising selecting a region suspected of being manipulated.

5. The method of claim 3, further comprising calculating a pixel intensity histogram for each of the second and/or third image.

6. The method of claim 5, further comprising calculating initial curve-fitting parameters for two skewed Gaussian curves representing the pixel intensity histogram data for each of the second and/or third image.

7. The method of claim 6, wherein said two skewed Gaussian curves encode the degree of disorder and order of the image.

8. The method of claim 6, wherein said calculating initial curve-fitting parameters for each skewed Gaussian curve uses a stochastic funnel algorithm.

9. The method of claim 8, wherein Gaussian curve parameters for each of the two Gaussian curves are calculated from said initial curve parameters using the least squares method (LSM).

10. The method of claim 6, further comprising finding an intersection between said two Gaussian curves for each of the second image and/or the third image.

11. The method of claim 10, wherein said intersection is found using a root-find algorithm.

12. The method of claim 11, wherein said root-find algorithm is Newton's method.

13. The method of claim 11, further comprising calculating the number of standard deviations that the intersection is away from the center point of the Gaussian curve that has the higher center point along the pixel intensity axis of the two fitted Gaussian curves for each of the second and/or the third images.

14. The method of claim 13, further comprising setting a threshold value, wherein the threshold value is set to the value of the highest center point value minus the floor of said number of standard deviations for each of the second and/or the third images.

15. The method of claim 14, further comprising performing a binary threshold on said grayscale image of each of the second and/or the third image and converting to a binary image where a first color represents regions with order below said binary threshold, and a second color represents regions above said binary threshold.

16. The method of claim 15, further comprising calculating the S or $S^2$ value in each of the second and/or third images by counting the number of pixels with values above said binary threshold in said grayscale image and dividing by the total number of pixels in said grayscale image.

17. The method of claim 16, wherein said calculating the S or $S^2$ value in each of the second and/or third images comprises calculating an S or $S^2$ value for each of the second and third images.

18. The method of claim 1, wherein said predefined criteria indicative of an altered image comprise a difference in numerical values between the second and third images of 2% or more.

19. The method of claim 1, wherein said predefined criteria indicative of an altered image comprise a difference in numerical values between the second and third images of 5% or more.

20. The method of claim 1, wherein said first image is from a video source.

* * * * *